United States Patent
Luo et al.

(10) Patent No.: US 12,218,712 B2
(45) Date of Patent: Feb. 4, 2025

(54) INTERFERENCE DETECTION METHOD AND APPARATUS, STORAGE MEDIUM, AND TERMINAL

(71) Applicant: RDA MICROELECTRONICS TECHNOLOGIES (SHANGHAI) CO., LTD., Shanghai (CN)

(72) Inventors: Liyun Luo, Shanghai (CN); Kai Li, Shanghai (CN)

(73) Assignee: RDA MICROELECTRONICS TECHNOLOGIES (SHANGHAI) CO., LTD., Shanghai (CN)

( * ) Notice: Subject to any disclaimer, the term of this patent is extended or adjusted under 35 U.S.C. 154(b) by 415 days.

(21) Appl. No.: 17/787,246

(22) PCT Filed: Apr. 15, 2020

(86) PCT No.: PCT/CN2020/084828
§ 371 (c)(1),
(2) Date: Jun. 17, 2022

(87) PCT Pub. No.: WO2021/120466
PCT Pub. Date: Jun. 24, 2021

(65) Prior Publication Data
US 2023/0019598 A1  Jan. 19, 2023

(30) Foreign Application Priority Data
Dec. 19, 2019 (CN) .......................... 201911318762.5

(51) Int. Cl.
*H04B 17/327* (2015.01)
*H04B 17/345* (2015.01)
(Continued)

(52) U.S. Cl.
CPC ......... *H04B 17/327* (2015.01); *H04B 17/345* (2015.01); *H04W 72/0473* (2013.01); *H04W 72/541* (2023.01)

(58) Field of Classification Search
CPC .............. H04B 17/327; H04B 17/345; H04W 72/0473; H04W 72/541; H04W 72/02
See application file for complete search history.

(56) References Cited

FOREIGN PATENT DOCUMENTS

| CN | 101635602 A | 1/2010 |
|----|-------------|--------|
| CN | 106033972 A | 10/2016 |

(Continued)

OTHER PUBLICATIONS

International Search Report and Written Opinion for PCT/CN2020/084828, dated Sep. 24, 2020; 9 pages, including English translation of Search Report.

*Primary Examiner* — Melvin C Marcelo
*Assistant Examiner* — Natali Pascual Peguero
(74) *Attorney, Agent, or Firm* — Schwabe, Williamson & Wyatt, P.C.

(57) ABSTRACT

An interference detection method and apparatus, a storage medium, and a terminal are provided. The method includes: receiving a signal; obtaining a power value of the signal as a first power; filtering the signal to obtain a filtered signal; obtaining a power value of the filtered signal as a second power; and determining whether a frequency channel where the signal is located is an interference frequency channel or a non-interference frequency channel based on a comparison result of a ratio of the first power to the second power and a preset threshold.

20 Claims, 3 Drawing Sheets

(51) Int. Cl.
*H04W 72/04* (2023.01)
*H04W 72/044* (2023.01)
*H04W 72/541* (2023.01)

(56) References Cited

FOREIGN PATENT DOCUMENTS

| | | | | |
|---|---|---|---|---|
| CN | 107204786 A | * | 9/2017 | ........... H04B 1/1018 |
| CN | 108810923 A | | 11/2018 | |
| CN | 110890929 A | | 3/2020 | |
| JP | 2013141143 A | | 7/2013 | |

* cited by examiner

INTERFERENCE DETECTION METHOD AND APPARATUS, STORAGE MEDIUM, AND TERMINAL

CROSS-REFERENCE TO RELATED APPLICATIONS

This application is the national phase entry under 35 U.S.C. § 371 of International Application No. PCT/CN2020/084828, filed on Apr. 15, 2020, which designates the United States of America, which claims priority to Chinese Patent Application No. 201911318762.5, filed on Dec. 19, 2019, and entitled "INTERFERENCE DETECTION METHOD AND APPARATUS, STORAGE MEDIUM, AND TERMINAL", the entire disclosures of each of these applications are incorporated herein by reference in their entireties and for all purposes.

TECHNICAL FIELD

The present disclosure generally relates to communication technology field, and more particularly, to an interference detection method and apparatus, storage medium, and terminal.

BACKGROUND

A Blue Tooth (BT) is used to define a short-range radio network and was originally used to replace a cable. The BT may be used to form an ad hoc network including less than 8 devices, where one device is called a master and the other devices are called slaves. The slaves may communicate with the master, and may communicate with each other through the master. A BT device is designed to discover and exchange information with other BT devices within their communication range.

In an existing technology, a BT system works in 2.4G, and most devices work in the 2.4G frequency band which cause serious interference. Further, existing methods for detecting interference are relatively complex, and power consumption and cost is high.

Therefore, there is a need for a method for detecting interference, so as to reduce complexity, power consumption and cost in a process of determining an interference frequency channel.

SUMMARY

Embodiments of the present disclosure provide a method for detecting interference and apparatus, a storage medium, and a terminal, which can determine whether there is interference in a process of determining an interference frequency channel only by receiving useful signal channel measurement power, thereby reducing complexity, power consumption and cost.

In an embodiment of the present disclosure, a method for detecting interference is provided, including: receiving a signal; obtaining a power value of the signal as a first power; filtering the signal to obtain a filtered signal; obtaining a power value of the filtered signal as a second power; and determining whether a frequency channel where the signal is located is an interference frequency channel or a non-interference frequency channel based on a comparison result of a ratio of the first power to the second power and a preset threshold.

In an embodiment of the present disclosure, a non-transitory storage medium is provided, the storage medium storing one or more programs, the one or more programs including computer instructions, which, when executed by a processor, cause the processor to: receive a signal; obtain a power value of the signal as a first power; filter the signal to obtain a filtered signal; obtain a power value of the filtered signal as a second power; and determine whether a frequency channel where the signal is located is an interference frequency channel or a non-interference frequency channel based on a comparison result of a ratio of the first power to the second power and a preset threshold.

In an embodiment of the present disclosure, a terminal is provided, the terminal includes a memory and a processor, wherein the memory has computer instructions stored therein, and the method based on above embodiments is performed, once the processor executes the computer instructions.

DETAILED DESCRIPTION

In an existing technology, a Blue Tooth (BT) may be used to form an ad hoc network of up to 8 devices, wherein one device is called a master and the other devices are called slaves. A BT system works in 2.4G, there are many devices work in the 2.4G frequency band, and thus interference is serious. Therefore, there is a need for a method for detecting interference.

Inventors of the present disclosure have found through research that the existing technology requires an additional measurement module for detecting interference, which leads to higher cost and increased complexity.

In the embodiment of the present disclosure, a signal is received; a power value of the signal is obtained as a first power; the signal is filtered to obtain a filtered signal; a power value of the filtered signal is obtained as a second power; and whether a frequency channel where the signal is located is determined as an interference frequency channel or not based on a comparison result of a ratio of the first power to the second power and a preset threshold. According to the embodiment of the present disclosure, the signal is received, and based on the comparison result of the ratio of the first power obtained by measuring the signal to the second power obtained by measuring the signal again after filtering and the preset threshold, the frequency channel where the signal is located is determined as the interference frequency channel or the non-interference frequency channel. Compared with the existing technology which requires an additional measurement module for detecting interference, the embodiment of the present disclosure may determine whether there is an interference in a process of determining an interference frequency channel only by receiving useful signal channel measurement power, thereby reducing complexity, power consumption and cost.

In order to clarify the object, characteristic and advantages of embodiments of the present disclosure, the embodiments of present disclosure will be described clearly in detail in conjunction with accompanying drawings.

Figure 1:
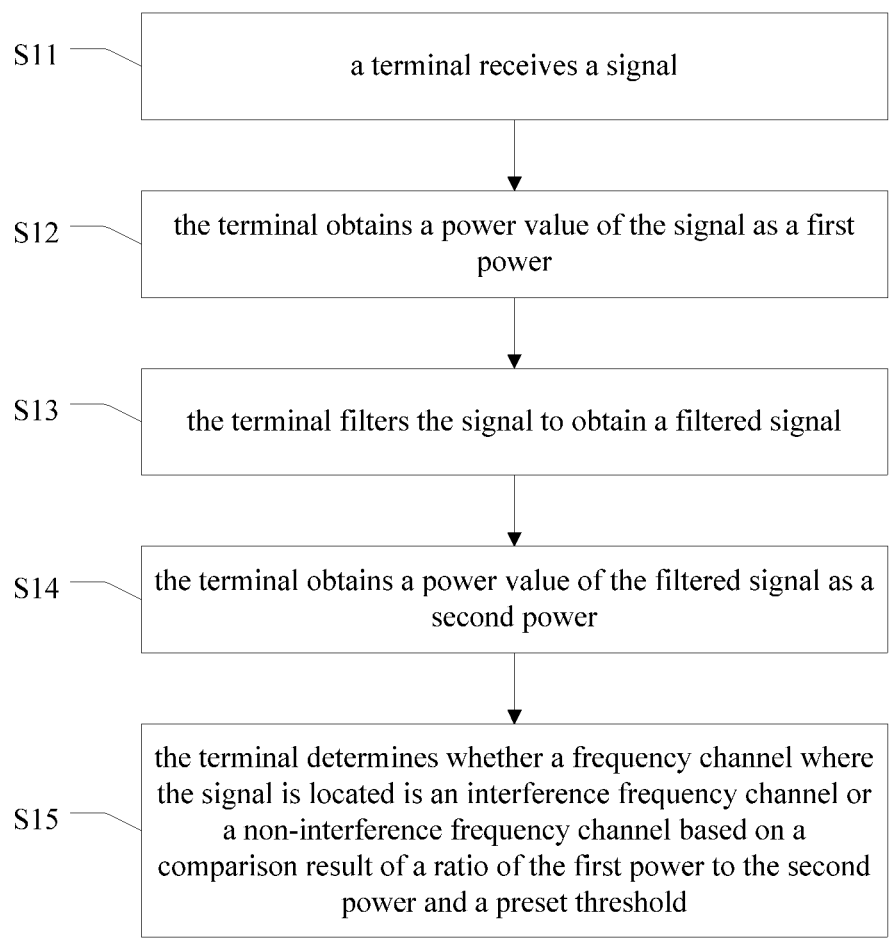
FIG. 1 schematically illustrates a flowchart of a method for detecting interference according to an embodiment of the present disclosure.

Referring to FIG. 1, FIG. 1 schematically illustrates a flowchart of a method for detecting interference according to an embodiment of the present disclosure. The method may include S11, S12, S13, S14 and S15.

In S11, a terminal receives a signal.

In S12, the terminal obtains a power value of the signal as a first power.

In S13, the terminal filters the signal to obtain a filtered signal.

In S14, the terminal obtains a power value of the filtered signal as a second power.

In S15, the terminal determines whether a frequency channel where the signal is located is an interference frequency channel or a non-interference frequency channel based on a comparison result of a ratio of the first power to the second power and a preset threshold.

In a specific implementation of S11, the signal may be a Blue Tooth (BT) signal. For example, the signal may be received from a Radio, or may be received from other conventional ways.

Figure 2:
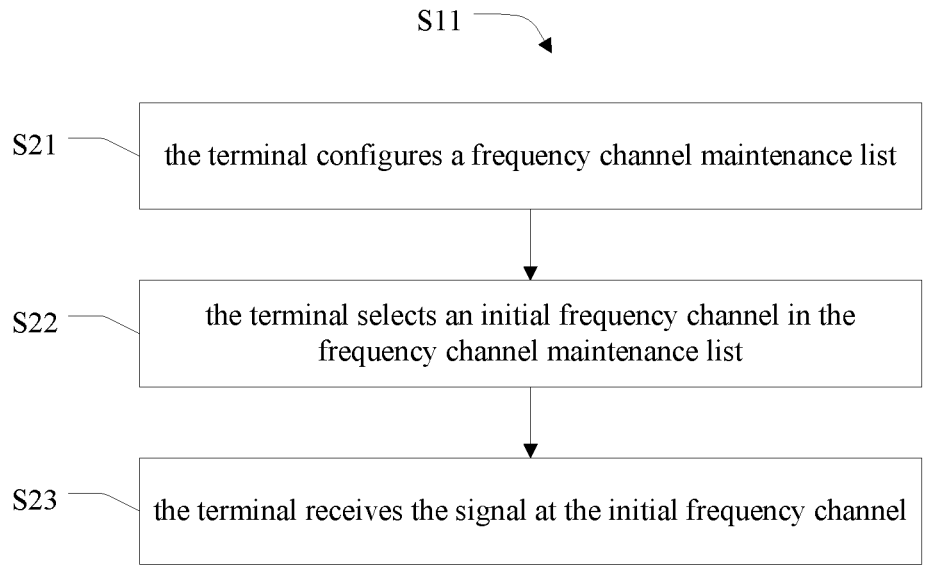
FIG. 2 schematically illustrates a flowchart of a specific implementation of S11 as shown in FIG. 1.

Referring to FIG. 2, FIG. 2 schematically illustrates a flowchart of a specific implementation of S11 as shown in FIG. 1. The process of receiving the signal may include S21, S22 and S23, which is described below.

In S21, the terminal configures a frequency channel maintenance list.

The frequency channel maintenance list contains at least a part of non-interference frequency channels determined in previous detections.

Specifically, the frequency channel maintenance list may be preset, and the frequency channel maintenance list may store non-interference frequency channels that have ever been determined.

In a specific implementation of embodiments of the present disclosure, all non-interference frequency channels that have been determined in previous detections may be stored, that is, all non-interference frequency channels that have ever been determined may be stored, which increases options to the maximum extent.

In another specific implementation of embodiments of the present disclosure, a part of non-interference frequency channels that have been determined in previous detections may be stored, that is, a part of non-interference frequency channels that have ever been determined may be stored, which does not require large storage space and storage cost in a process of storing the non-interfering frequency channels.

In S22, the terminal selects an initial frequency channel in the frequency channel maintenance list.

Specifically, when powering on for a first time, the terminal may select a frequency channel of any one of working frequency bands in the frequency channel maintenance list, and set the selected frequency channel as an initial frequency channel; the terminal may also predetermine a sequence number, select a frequency channel corresponding to the sequence number in the frequency channel maintenance list, and set the frequency channel as the initial frequency channel, such as a first frequency channel or a last frequency channel.

When powering on for another time, the terminal may use other ways to determine the frequency channel.

In a specific implementation of embodiments of the present disclosure, a latest adopted frequency channel marked in a previous interference detection is determined as an initial frequency channel, that is, using the non-interference frequency channel marked in the most recent marking, which may utilize the previous detection results better and further improve efficiency of selecting a non-interference frequency channel.

In another specific implementation of embodiments of the present disclosure, a new non-interference frequency channel added in a previous interference detection is determined as the initial frequency channel, that is, using the added non-interference frequency channel, which may utilize the previous detection results better and further improve efficiency of selecting a non-interference frequency channel.

In S23, the terminal receives the signal at the initial frequency channel.

In embodiments of the present disclosure, the terminal may select an appropriate initial frequency channel in the frequency channel maintenance list, and receive the signal at the initial frequency channel. Therefore, the non-interference frequency channels may be preferentially selected based on previous detection results, which helps to improve probability of selecting the non-interference frequency channel and to further reduce cost.

Continue to refer to FIG. 1, in a specific implementation of S12, the terminal obtains the power value of the signal as the first power.

Specifically, a conventional method for detecting power may be used to obtain the power value of the signal, which is not limited here.

In a specific implementation of S13, the terminal filters the signal to obtain the filtered signal.

Specifically, a digital filter may be used to perform a digital filtering on the signal, and other appropriate filtering methods may also be used for filtering, which is not limited here.

In a specific implementation of S14, the terminal obtains the power value of the filtered signal as the second power.

Specifically, a conventional method for detecting power may be used to obtain the power value of the signal, which is not limited here.

In a specific implementation of S15, the terminal determines whether the frequency channel where the signal is located is the interference frequency channel or the non-interference frequency channel based on the comparison result of the ratio of the first power to the second power and the preset threshold.

Figure 3:
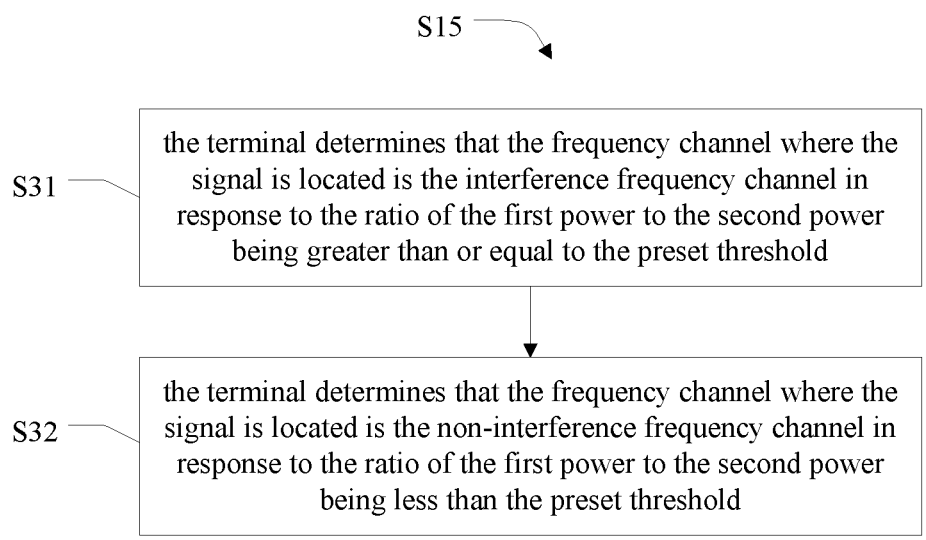
FIG. 3 schematically illustrates a flowchart of a specific implementation of S15 as shown in FIG. 1.

Referring to FIG. 3, FIG. 3 schematically illustrates a flowchart of a specific implementation of S15 as shown in FIG. 1. A process of determining whether the frequency channel where the signal is located is the interference frequency channel or the non-interference frequency channel based on the comparison result of the ratio of the first power to the second power and the preset threshold may include: S31 and S32, which is described below.

In S31, the terminal determines that the frequency channel where the signal is located is the interference frequency channel in response to the ratio of the first power to the second power being greater than or equal to the preset threshold.

In S32, the terminal determines that the frequency channel where the signal is located is the non-interference frequency channel in response to the ratio of the first power to the second power being less than the preset threshold.

It should be pointed out that the preset threshold should not be set too narrow, otherwise, when a difference between the power value of the signal and the power value of the filtered signal is small, that is, when degree of interference is low, the frequency channel may also be incorrectly determined as an interference frequency channel. The preset threshold should not be set too high, otherwise, when a difference between the power value of the signal and the power value of the filtered signal is large, that is, when degree of interference is high, the frequency channel is determined as a non-interference frequency channel because the tolerance is too high.

As a non-limiting example, the preset threshold may be set to 1.2-5, for example, set to 2.

It should be pointed out that, in the method for detecting interference, before receiving the signal as shown in S11, the method may further include: turning on a receiver for a preset time period in advance to wait for receiving the signal.

In the embodiments of the present disclosure, by turning on the receiver for a preset time period in advance, the terminal may turn on the receiver to receive the signal before the appointed time window to receive the signal, thereby improving success rate and accuracy of signal reception.

According to the embodiment of the present disclosure, the signal is received, and based on the comparison result of the ratio of the first power obtained by measuring the signal to the second power obtained by measuring the signal again after filtering and the preset threshold, the frequency channel where the signal is located is determined as the interference frequency channel or the non-interference frequency channel Compared with the existing technology which requires an additional measurement module for detecting interference, the embodiment of the present disclosure may determine whether there is an interference in a process of determining an interference frequency channel only by receiving useful signal channel measurement power, thereby reducing complexity, power consumption and cost.

Further, if the initial frequency channel selected for the first time is an interference frequency channel, the method for detecting interference further includes: selecting frequency channels in sequence until a non-interference frequency channel is selected.

The terminal selects frequency channels in sequence in the frequency channel maintenance list, receives the signal on each selected frequency channel and determines whether the selected frequency channel is the non-interference frequency channel, until the currently selected frequency channel is determined as the non-interference frequency channel, or, all frequency channels in the frequency channel maintenance list are determined as interference frequency channels.

Specifically, the terminal repeats S11 to S15 as shown in FIG. 1 on each selected frequency channel sequentially to determine whether the selected frequency channel is the interference frequency channel or the non-interference frequency channel. If the frequency channel is determined as the non-interference frequency channel, the terminal stops selection. If the frequency channel is the interference frequency channel, the terminal continues to select a next frequency channel and continues to repeat S11 to S15 as shown in FIG. 1 until all frequency channels in the frequency channel maintenance list are determined as interference frequency channels.

In the first case, the terminal marks the non-interference frequency channel as a latest adopted frequency channel in the frequency channel maintenance list if the currently selected frequency channel is determined as the non-interference frequency channel.

In the embodiment of the present disclosure, in the case that the non-interference frequency channel is determined each time and the non-interference frequency channel is in the frequency channel maintenance list, the terminal may make a record of the non-interference frequency channel by marking for convenient use in subsequent process.

Further, the terminal selects an initial frequency channel in the frequency channel maintenance list may include: determining a latest adopted frequency channel marked in a last interference detection as the initial frequency channel.

According to the embodiment of the present disclosure, the non-interference frequency channel is marked as a latest adopted frequency channel, and a latest adopted frequency channel marked in the previous interference detection is determined as the initial frequency channel, which may utilize the previous detection results better and further improve efficiency of selecting a non-interference frequency channel.

In the second case, the terminal selects frequency channels in sequence from outside the frequency channel maintenance list in response to all the frequency channels in the frequency maintenance list being determined as interference frequency channels, receives the signal on each selected frequency channel and determines whether the selected frequency channel outside the frequency channel maintenance list is the non-interference frequency channel, until the currently selected frequency channel is determined as a new non-interference frequency channel.

Further, the terminal adds the new non-interference frequency channel to the frequency channel maintenance list.

In the embodiment of the present disclosure, in the case that a non-interference frequency channel is determined each time, and the non-interference frequency channel is not in the frequency channel maintenance list, the terminal may add the non-interference frequency channel to the frequency channel maintenance list for convenient use in subsequent process.

Further, the terminal selecting an initial frequency channel in the frequency channel maintenance list may include: determining the new non-interference frequency channel added in a previous interference detection as the initial frequency channel.

According to the embodiment of the present disclosure, the non-interference frequency channel is added to the frequency channel maintenance list, and a new non-interference frequency channel added in the previous interference detection is determined as the initial frequency channel, which may utilize the previous detection results better and further improve efficiency of selecting a non-interference frequency channel.

Figure 4:
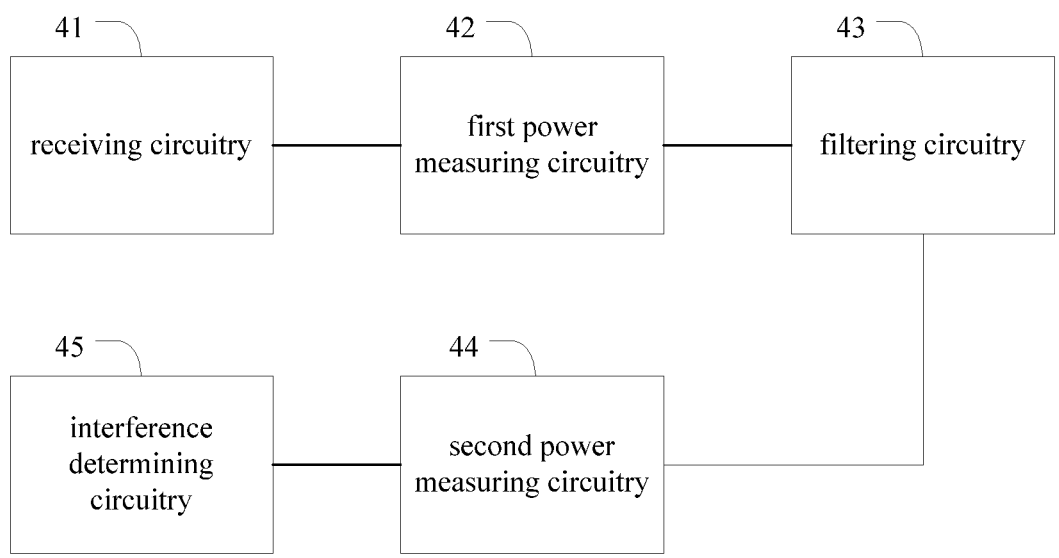
FIG. 4 schematically illustrates a structure diagram of an apparatus for detecting interference according to an embodiment of the present disclosure.

Referring to FIG. 4, FIG. 4 schematically illustrates a structure diagram of an apparatus for detecting interference according to an embodiment of the present disclosure. The apparatus may include: a receiving circuitry 41, a first power measuring circuitry 42, a filtering circuitry 43, a second power measuring circuitry 44 and an interference determining circuitry 45.

The receiving circuitry 41 is adapted to receive a signal.

The first power measuring circuitry 42 is adapted to obtain a power value of the signal as a first power.

The filtering circuitry 43 is adapted to filter the signal to obtain a filtered signal.

The second power measuring circuitry 44 is adapted to obtain a power value of the filtered signal as a second power.

The interference determining circuitry 45 is adapted to determine that a frequency channel where the signal is located is an interference frequency channel in response to the ratio of the first power to the second power being greater than or equal to a preset threshold.

For principles, specific implementations and beneficial effects of the apparatus for detecting interference, reference may be made to the relevant descriptions in FIG. 1 to FIG. 3, which is not be repeated here.

In an embodiment of the present disclosure, a storage medium having computer instructions stored therein is provided, wherein when the computer instructions are executed, any one of the above methods for detecting interference is performed. In some embodiment, the storage medium may be a computer readable storage medium, and may include a non-volatile or a non-transitory memory, or include an optical disk, a mechanical hard disk, and a solid-state hard disk.

Specifically, in the embodiments of the present disclosure, the processor may be a Central Processing Unit (CPU), or other general processors, Digital Signal Processors (DSP), Application Specific Integrated Circuits (ASIC), Field Programmable Gate Arrays (FPGA) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory, or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

In an embodiment of the present disclosure, a terminal including a memory and a processor is provided, wherein the memory has computer instructions stored therein, and when the processor executes the computer instructions, any one of the above methods for detecting interference is performed. The terminal may include but are not limited to terminal devices such as mobile phone, computer, and tablet computer.

Further, the terminal may be a BT terminal, and the method for detecting interference may be used for detecting interference of a BT terminal.

Specifically, a terminal in embodiments of the present disclosure may refer to various forms of User Equipment (UE), access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for detecting interference, comprising:
receiving a signal;
obtaining a power value of the signal as a first power;
filtering the signal to obtain a filtered signal;
obtaining a power value of the filtered signal as a second power; and
determining whether a frequency channel where the signal is located is an interference frequency channel or a non-interference frequency channel based on a comparison result of a ratio of the first power to the second power and a preset threshold.

2. The method according to claim 1, wherein said determining whether the frequency channel where the signal is located is the interference frequency channel or the non-interference frequency channel based on the comparison result of the ratio of the first power to the second power and the preset threshold comprises:
determining that the frequency channel where the signal is located is the interference frequency channel in response to the ratio of the first power to the second power being greater than or equal to the preset threshold; and
determining that the frequency channel where the signal is located is the non-interference frequency channel in response to the ratio of the first power to the second power being less than the preset threshold.

3. The method according to claim 2, wherein said receiving the signal comprises:
configuring a frequency channel maintenance list;
selecting an initial frequency channel in the frequency channel maintenance list; and
receiving the signal at the initial frequency channel; wherein
the frequency channel maintenance list contains at least a part of non-interference frequency channels determined in previous detections.

4. The method according to claim 3, further comprising:
selecting frequency channels in sequence in the frequency channel maintenance list, receiving the signal on each selected frequency channel and determining whether the selected frequency channel is the non-interference frequency channel, until determining that a currently selected frequency channel is the non-interference frequency channel, or, determining that all frequency channels in the frequency channel maintenance list are interference frequency channels.

5. The method according to claim 4, further comprising:
marking the non-interference frequency channel as a latest adopted frequency channel in the frequency channel maintenance list in response to the currently selected frequency channel being determined as the non-interference frequency channel.

6. The method according to claim 5, wherein said selecting an initial frequency channel in the frequency channel maintenance list comprises:
determining a latest adopted frequency channel marked in a last interference detection as the initial frequency channel.

7. The method according to claim 4, further comprising:
selecting frequency channels in sequence from outside the frequency channel maintenance list in response to all the frequency channels in the frequency maintenance list being determined as interference frequency channels, receiving the signal on each selected frequency channel and determining whether the selected frequency channel outside the frequency channel maintenance list is the non-interference frequency channel, until the currently selected frequency channel is determined as a new non-interference frequency channel.

8. The method according to claim 7, further comprising:
adding the new non-interference frequency channel to the frequency channel maintenance list.

9. The method according to claim 8, wherein said selecting the initial frequency channel in the frequency channel maintenance list comprises:
determining the new non-interference frequency channel in a previous interference detection as the initial frequency channel.

10. The method according to claim 1, wherein before receiving the signal, the method further comprises:
turning on a receiver for a preset time period in advance to wait for receiving the signal.

11. A terminal comprising a memory and a processor, wherein the memory has computer instructions stored therein, and the method of claim 1 is performed, once the processor executes the computer instructions.

12. The terminal according to claim 11, wherein the terminal comprises a Blue Tooth (BT) terminal.

13. A non-transitory storage medium storing one or more programs, the one or more programs comprising computer instructions, which, when executed by a processor, cause the processor to:
receive a signal;
obtain a power value of the signal as a first power;
filter the signal to obtain a filtered signal;
obtain a power value of the filtered signal as a second power; and
determine whether a frequency channel where the signal is located is an interference frequency channel or a non-interference frequency channel based on a comparison result of a ratio of the first power to the second power and a preset threshold.

14. The non-transitory storage medium according to claim 13, wherein said determining whether the frequency channel where the signal is located is the interference frequency channel or the non-interference frequency channel based on the comparison result of the ratio of the first power to the second power and the preset threshold comprises:
determining that the frequency channel where the signal is located is the interference frequency channel in response to the ratio of the first power to the second power being greater than or equal to the preset threshold; and
determining that the frequency channel where the signal is located is the non-interference frequency channel in response to the ratio of the first power to the second power being less than the preset threshold.

15. The non-transitory storage medium according to claim 14, wherein said receiving the signal comprises:
configuring a frequency channel maintenance list;
selecting an initial frequency channel in the frequency channel maintenance list; and
receiving the signal at the initial frequency channel; wherein
the frequency channel maintenance list contains at least a part of non-interference frequency channels determined in previous detections.

16. The non-transitory storage medium according to claim 15, wherein the processor is further caused to:
select frequency channels in sequence in the frequency channel maintenance list, receive the signal on each selected frequency channel and determine whether the selected frequency channel is the non-interference frequency channel, until determine that a currently selected frequency channel is the non-interference frequency channel, or, determine that all frequency channels in the frequency channel maintenance list are interference frequency channels.

17. The non-transitory storage medium according to claim 16, wherein the processor is further caused to:
mark the non-interference frequency channel as a latest adopted frequency channel in the frequency channel maintenance list in response to the currently selected frequency channel being determined as the non-interference frequency channel.

18. The non-transitory storage medium according to claim 17, wherein said selecting an initial frequency channel in the frequency channel maintenance list comprises:
determining a latest adopted frequency channel marked in a last interference detection as the initial frequency channel.

19. The non-transitory storage medium according to claim 16, wherein the processor is further caused to:
select frequency channels in sequence from outside the frequency channel maintenance list in response to all the frequency channels in the frequency maintenance list being determined as interference frequency channels, receive the signal on each selected frequency channel and determine whether the selected frequency channel outside the frequency channel maintenance list is the non-interference frequency channel, until the currently selected frequency channel is determined as a new non-interference frequency channel.

20. The non-transitory storage medium according to claim 16, wherein the processor is further caused to:
add the new non-interference frequency channel to the frequency channel maintenance list.

* * * * *